(No Model.)
C. J. HOLMAN.
VEHICLE WHEEL.
No. 509,809. Patented Nov. 28, 1893.
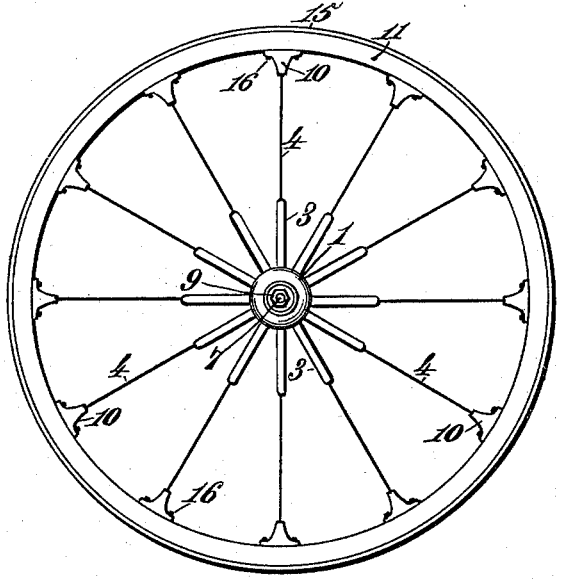
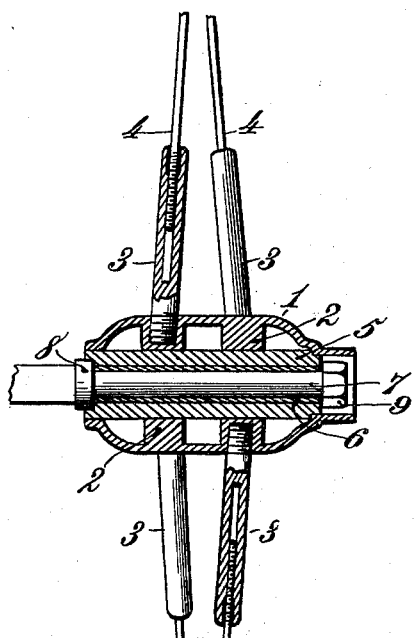
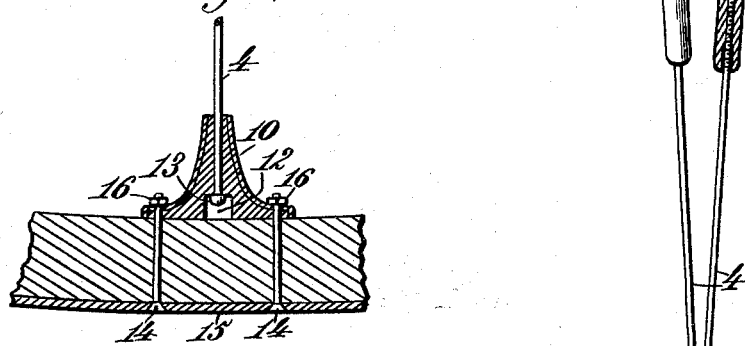
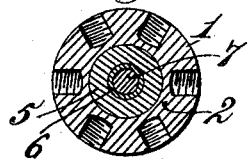
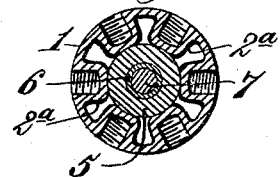
Witnesses.
Robert Barrett,
G. W. Rea
Inventor.
Calvin J. Holman.
By James L. Norris.
Atty.

UNITED STATES PATENT OFFICE.

CALVIN J. HOLMAN, OF CHICAGO, ILLINOIS, ASSIGNOR OF TWO-THIRDS TO EUGENE K. BOWEN AND WILLIAM H. WINEGARDNER, OF SAME PLACE.

VEHICLE-WHEEL.

SPECIFICATION forming part of Letters Patent No. 509,809, dated November 28, 1893.

Application filed August 9, 1893. Serial No. 482,765. (No model.)

*To all whom it may concern:*

Be it known that I, CALVIN J. HOLMAN, a citizen of the United States, residing at Chicago, in the county of Cook and State of Illinois, have invented new and useful Improvements in Vehicle-Wheels, of which the following is a specification.

My invention relates to that class of vehicle-wheels in which the spokes are clipped to the felly and so connected with the hub as to be capable of easy adjustment for giving the desired strain or tension to the wheel.

The objects of my invention are to provide a metallic hub of light, strong and durable construction and having a smooth and unbroken exterior similar to the best class of wood hubs; to provide the wheel with light, flexible metallic spokes having a screw threaded connection with spuds screwed into the hub and into or through internal rings or annular series of tubular bosses or blocks integral with the inside of the metallic hub shell so that by rotating the spuds a proper strain or tension can be imparted to the spokes; and to provide clips of novel and improved construction for connecting the spokes with the wheel rim without cutting or recessing the felly or in any way impairing its strength.

The invention consists in the features of construction and novel combinations of parts in a wheel for carriages and various vehicles, as hereinafter more fully set forth.

In the annexed drawings illustrating the invention—Figure 1 is a side elevation of my improved wheel. Fig. 2 is a transverse section of the wheel with the hub in longitudinal section. Fig. 3 is an enlarged longitudinal section of a portion of the felly with attached clip for securing the outer end of a spoke. Fig. 4 is an enlarged transverse section of hub provided with internal spoke attaching rings. Fig. 5 is a similar section of hub provided internally with annular series of tubular bosses or blocks in lieu of rings.

Referring to the drawings, the numeral 1 designates a metallic wheel-hub in the form of a shell of cast-iron, malleable steel, brass or other metal, contracted at its ends and provided internally with two annular rings 2 integral with the internal surface of the shell. In the internal rings 2 are formed annular series of screw threaded openings, that are extended through the shell and arranged at proper intervals to receive and support the spuds 3 to which the inner ends of the spokes 4 are attached.

While I prefer to provide the metallic hub shell with the integral internal rings 2, it is obvious that in lieu of said rings there may be formed on the inside of the shell two annular series of tubular internally screw threaded blocks or bosses $2^a$, to receive the externally screw threaded ends of the spuds. These annular series of blocks or bosses would be substantially the same as sectional rings. Either the rings or the annular series of blocks integral with the inside of the hub shell will permit the employment of a comparatively thin metallic shell and thereby combine the advantages of strength and lightness in the construction of the hub.

The hub center receives an axle box 5 that is accurately keyed in the openings inclosed by the internal hub rings. If desired a hardened steel sleeve 6 may be inserted in the axle box to receive the axle spindle 7 which is provided at its inner end with a collar 8 and at its outer end with a nut 9, as shown, to hold the wheel in place.

It will be observed that by arranging the spoke supporting rings or blocks on the inner side of the hub shell and integral therewith I am enabled to provide the hub with a smooth and solid exterior without seams or joints and at the same time afford a better support for the spokes than is possible with a thin metallic shell of uniform thickness. With this construction the hub is light, strong and durable; it has a perfectly smooth exterior surface like a wood hub; and the attachment of the spokes is made more firm and secure.

The spuds or spoke supports 3 are externally screw threaded at one end to screw into the hub and through or nearly through, the internal hub rings 2 or annular series of bosses $2^a$, as shown. Each spud is of sufficient length to permit its outer end being longitudinally drilled or screw tapped to such depth as will afford adequate support for the screw threaded end of a spoke inserted therein.

I prefer to have the spokes 4 made of steel or hard brass. The inner screw threaded ends of the spokes are received in the supporting and straining spuds 3 in the manner described, to permit varying the tension as desired which is readily accomplished by turning or rotating the spud by operating on their outer end portions which project radially a considerable distance from the periphery of the hub. At their outer ends the spokes 4 are secured in chambered clips 10 bolted or riveted to the wheel felly. The outer end of each spoke, next to the felly 11, is passed through an opening in the felly clip 10 and is riveted on the inside of the said clip in a small chamber 12 provided in the body of the clip for its reception, leaving a small space between the end of the spoke and the felly. The head or rivet 13 on the end of the spoke does not enter the felly but is wholly inclosed in the chamber 12 of the clip, thereby avoiding all liability of weakening the felly by forming chambers or recesses therein. The clip 10 is of the same width as the inner side of the felly 11 and is made of sufficient length to receive two bolts 14, passed through the tire 15 and through the felly and clip, as shown. The bolts 14 may be secured at their inner ends by nuts 16, or in lieu of nuts the inner ends of the bolts may be struck up or riveted.

It will be observed that the spokes 4 are set staggered on opposite sides of the center of the hub, as usual. Each spoke being provided at its inner end with an attaching spud 3 having a screw threaded connection with the spoke and with the internal rings or bosses of the hub it is obvious that in order to adjust the spokes it is only necessary to rotate the spuds in the required direction and thereby impart the desired tension to the wheel.

What I claim as my invention is—

1. The metallic hub shell having internal rings provided with annular series of screw-threaded perforations extended through the hub shell, in combination with the spuds screwed into said perforations and adapted to receive and have screw threaded connection with the inner ends of the spokes, substantially as described.

2. The combination with the hub and spokes, of staggered spuds screwed into the hub and having their outer ends projecting radially from the periphery of the hub and screw tapped to receive the inner screw threaded ends of the spokes, substantially as described.

3. A metallic hub provided with internal rings or bosses and perforations extended through said rings or bosses and through the hub shell for connection with the spokes, in combination with an axle box keyed in the hub center or openings inclosed by said internal rings or bosses, substantially as described.

4. The combination of a metallic hub shell provided with internal rings, an axle box keyed in the hub center, spuds screwed into the hub and having their outer ends longitudinally screw tapped, and spokes having inner screw threaded ends inserted into the tapped ends of the spuds, substantially as described.

5. The combination of a hub composed of a light metallic shell provided with internal rings having perforations or screw threaded openings extended through said shell, spuds having externally screw threaded inner ends inserted in said hub openings and provided with longitudinally screw tapped outer ends, metallic spokes having screw threaded inner ends engaged in the tapped outer ends of the spuds, and clips for connecting the outer ends of the spokes with the felly, substantially as described.

6. A hub composed of a light metallic shell having internal rings or bosses and screw threaded perforations for connection with the spokes, and an axle box keyed in the hub center or openings inclosed by said rings or bosses, substantially as described.

7. The combination of a metallic hub composed of a light shell strengthened by internal rings and having screw threaded perforations entering said rings and extended through the shell, spuds screwed into said perforations metallic spokes having screw threaded connection with the spuds, and clips secured to the felly and provided with chambers to receive the spoke heads, substantially as described.

In testimony whereof I have hereunto set my hand in presence of two subscribing witnesses.

CALVIN J. HOLMAN.

Witnesses:
W. H. WINEGARDNER,
P. F. HAYNES.